United States Patent Office 3,363,974
Patented Jan. 16, 1968

3,363,974
PROCESS FOR PREPARING ACTIVE
CUPROUS HALIDE SORBENTS
Edward A. Hunter, Lake Jackson, Tex., Gerald Albert Byard, Denham Springs, La., and Warren A. Knarr, Ponca City, Okla., assignors to Esso Research and Engineering Company, a corporation of Delaware
No Drawing. Filed June 29, 1965, Ser. No. 468,159
11 Claims. (Cl. 23—97)

ABSTRACT OF THE DISCLOSURE

Cuprous halide is incrementally added to a monoolefinic solvent and is substantially completely complexed out of solution with a suitable complexing agent prior to the next incremental addition of salt, the resulting complex leading to the preparation of highly active cuprous halide salts for sorption of ligands.

This invention is directed to an improved process for the preparation of active cuprous halide sorbents having improved particle size distribution in that the amount of active sorbent particle fines is minimized, viz., active particles having a particle size of less than 10 microns. More specifically, this invention is directed to an improved process for preparing active cuprous halide sorbents having good durability properties in use over repeated diolefin sorption-desorption cycles coupled with reduction in the amount of fines present by repeated cycles of incremental addition of the cuprous halide salt followed by substantially complete complexation thereof. The present process is one wherein only a portion of the total amount of cuprous chloride to be complexed is dissolved and complexed in each incremental phase of a given sorbent preparation campaign, which can be intermittent or continuous.

This invention, in brief compass, comprises preparing the active cuprous halide sorbent particles by adding the total amount of cuprous halide salt to be dissolved to the solvent preparation system in a plurality of incremental steps (at least two and preferably three such addition and dissolving steps) each of which is followed by substantially complete complexing of the dissolving cuprous halide salt before further incremental addition of more cuprous halide salt thereto, and complexation thereof. The term "dissolving" as used herein is intended to include not only solutions but also dispersions and slurries of the cuprous halide salt in the solvent(s) because all of the cuprous halide salt added in each incremental addition step need not be dissolved prior to contact with the complexing agent. That portion of cuprous halide salt, which is added in each incremental addition step but which is not dissolved prior to addition of the complexing agent, will be dissolved upon precipitation of dissolved cuprous halide salt in the form of an insoluble complex. Thus, the undissolved salt will go into solution continuously as the complex precipitates out. The concentration of the total cuprous halide salt to be added in any given incremental dissolving and complexation cycle should range from about 20 to 70 weight percent (based on total cuprous halide salt to be complexed) and the weight concentration of dissolved cuprous halide salt in solution at any incremental stage of the sorbent preparation campaign is usually less than about 20 weight percent. Usually, the percent of the total cuprous halide salt to be complexed in any incremental cycle of a given sorbent preparation campaign ranges from about 20 to 50 percent of the total amount to be complexed coupled with a weight concentration of dissolved and/or dispersed cuprous halide salt in solution and/or dispersion at any incremental stage of the sorbent preparation campaign ranging from about 2 to about 20 weight percent. Preferably from 20 to 40 percent of the total amount of cuprous chloride to be complexed is added in each incremental stage coupled with the maintenance of a weight percent concentration of cuprous halide salt in solvent at any incremental stage ranging from about 2 to about 15 weight percent. As mentioned hereinabove, each incremental amount of the cuprous halide salt is added to the selected solvent for dissolving and is substantially completely complexed prior to further incremental addition or additional cuprous halide salt in the sorbent preparation system.

In the preparation of cuprous halide sorbents capable of selective sorption of olefins from olefin-containing hydrocarbon streams, esp., selective sorption of diolefins from diolefinic-containing hydrocarbon streams, the active sorbents are prepared by precipitation with a suitable complexing ligand of an insoluble cuprous halide-ligand complex from an olefinic solution of cuprous halide salt previously dissolved or slurried in an olefin solvent(s). In such preparation of active halide sorbents, control of particle size of the product particles is extremely difficult. However, control of the particle size of these active sorbent particles is very important, especially when the active sorbent particles are to be used in fluidized bed separation and recovery processes because the presence of fines particles in fluidized activated cuprous halide sorbent beds tends to upset fluidization control, and hence to reduce the bed capacity for olefin sorption. Moreover, ineffective control of particle size distribution of these active cuprous halide sorbents, e.g., as occurs when the active sorbent contains even a moderate amount of fines, e.g., from 2 to 5 weight percent of active sorbent particles having a particle size of 10 microns and below, leads to elutriation (loss) of the active sorbent particles from the top of the fluidized bed. Elutriation is caused by upward movement of the fluidizing gas which picks up the fines particles causing their resulting removal from the fluidized bed. The present invention offers an effective solution to these problems of fluidization control, reduction in sorbent capacity of the fluidized bed of active sorbent particles, and elutriation of active sorbent from the fluidized bed.

The terms "sorbent," "sorbing," "sorb," and similar terms as used herein are used to include both absorption and adsorption as it is believed that both types of phenomena can be involved in selective recovery of olefins in accordance with the prevailing objectives of this invention. The term "ligand" as employed herein with respect to the complexing agent used is intended to denote the presence of a complexing agent containing a functional group capable of forming stable copper complexes having a mole ratio of copper to complexing moiety of >1:1. Preferably, a complexing agent is employed which forms a stable copper complex having a mole ratio of copper-to-complexing moiety of 2:1 and higher.

The first incremental portion of cuprous halide salt to be dissolved is added to a precooled olefinic solvent, preferably an olefinic solvent containing from 3 to 12 carbon atoms, with mechanical agitation in the form of stirring or other suitable agitation to assist in dissolution of the cuprous halide salt in the solvent. The solvent can be previously cooled to temperatures ranging from about −40 to 50° F., usually −20 to 45° F., and preferably −10 to 40° F. prior to addition of the cuprous halide salt thereto. Usually the requisite amounts of cuprous halide salt can be dissolved in time periods ranging from about 2 to 20 minutes, depending on the solubility of the preferred olefinic solvent.

Suitable cuprous halide salts for use in accordance with this invention include cuprous chloride, cuprous bromide, and cuprous iodide with the preferred cuprous halide salt being cuprous chloride. The purity of the cuprous halide salt employed should be at least about 90 percent. Usually, the purity of the cuprous halide salt ranges from about 90 to 100 percent, and preferably from 99.0 to 100 percent. The moisture content of the cuprous halide sorbent at the time it is added to the $C_3$ to $C_{12}$ monoolefin solvent(s) should usually not exceed 1.0 weight percent, and preferably should not exceed about 0.5 weight percent (based on dry cuprous halide salt).

The $C_3$ to $C_{12}$ monoolefins whose use is contemplated herein as solvents to dissolve the cuprous halide salts in accordance with this invention are: propene-1, butene-1, isobutylene, pentene-1, hexene-1, heptene-1, octene-1, nonene-1, decene-1, undecenes, dodecenes, and mixtures containing any two or more of the above mentioned $C_3$ to $C_{12}$ monoolefins. The solvent, when a mixture of two or more $C_3$ to $C_{12}$ monoolefins is employed, can contain a small amount of other hydrocarbon materials with the proviso being that the solvent mixture should be comprised chiefly of $C_3$ to $C_{12}$ monoolefins, viz, at least about 60 weight percent and preferably from 70 to 100 weight percent of said $C_3$ to $C_{12}$ monoolefins based on total solvent. Such optional hydrocarbon diluents as paraffins, cycloparaffins, cycloolefins, conjugated and nonconjugated diolefins, and aromatics can be tolerated if present in very small amounts. When conjugated diolefins are present, the concentration thereof should be less than 1.0 wt. percent, and preferably less than about 0.5 wt. percent (based on total solvent). Moreover, mixtures of commercially available olefin-containing hydrocarbon cuts can be employed as solvent, e.g. $C_3$ to $C_{12}$ hydrocarbon streams containing about 60+ wt. percent of monoolefins.

Before the first increment of the cuprous halide salt is added to the olefinic solvent, the solvent is cooled as mentioned above to a temperature ranging from about —40 to about +40° F. The cuprous halide salt is then incrementally added, as mentioned hereinabove, to the solvent with agitation until the solution contains from about 2 to 20 wt. percent cuprous halide dissolved or slurried therein. Throughout this time the temperature of the solvent is maintained as mentioned above at from —40 to +40° F. Subsequent to the cuprous halide salt dissolving step, substantially all of the dissolved and/or slurried cuprous halide is then complexed using a suitable complexing agent. As mentioned hereinabove, it is preferable to employ a complexing agent which forms an insoluble complex in the solvent or solvent mixture employed to dissolve the cuprous halide salt.

In incremental additions, the first increment of cuprous halide salt can be dissolved in the olefinic solvent before the addition of butadiene; or, where the cuprous halide exceeds the solubility of the olefinic solution, butadiene is added forthwith to the slurry. Being able to add butadiene without the necessity to completely dissolve the cuprous halide salt is a definite advantage in the process of this invention as this process is not limited to the solubility of the cuprous halide salt in the olefinic solvent(s) used.

During subsequent incremental additions of cuprous halide, the butadiene addition can be maintained continuously or continually until the final desired complexation is attained (essentially all of the added cuprous halide salt has been precipitated from solution).

The reasons for the improvements in particle size distribution coupled with fines reduction as achieved by the present invention are not completely understood. However, it can be theorized that these improvements are secured by incremental growth, e.g. after one portion of cuprous halide has been added to the solvent and precipitated with complexing agent, the additional increment(s) when added and precipitated tend to grow on the already complexed particles (particularly the smaller already complexed particles) rather than to nucleate and form new particles of complex. It should be understood, however, that this invention is not limited by any theory as to the operation thereof. The plain fact of the matter is that this invention provides particles having excellent particle size distribution coupled with reduced fines formation, regardless of the theory involved.

Suitable complexing agents include both materials which form only complexes having a mole ratio of copper-to-complexing agent greater than 1:1 and compounds which form complexes having a ratio of 1:1 or less, which upon decomplexing pass through a stable copper complex having a mole ratio of copper-to-complexing compound greater than 1:1. Thus, certain materials, e.g. nitriles, diolefins, acetylenes, and carbon monoxide under ordinary conditions forming a 2:1 mole complex can be made to complex in ratios of copper-to-complexing compound of 1:1 or less. However, upon dissociation, complexing material is released selectively from the bed of cuprous halide until the stable complex, viz, the complex having a copper-to-complexing moiety mole ratio above 1:1, e.g. 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein include, but are not limited to, the following: $C_3$ to $C_{10}$ conjugated or nonconjugated aliphatic, cyclic, or alicyclic polyolefins, e.g. butadiene-1,3; isoprene; piperylene; allene; isoprene; octadienes; cyclohexadienes; cyclooctadienes; divinylbenzene; cyclododecatriene; cyclooctatetraenes; $C_2$ to $C_{10}$ aliphatic or alicyclic acetylenes or acetylenes containing additional unsaturation, e.g. acetylene, methyl acetylene, propyl acetylenes, phenyl acetylenes, vinyl acetylenes, etc.; $C_2$ to $C_{10}$ or higher unsaturated or saturated aliphatic or alicyclic nitriles, e.g. acetonitrile, acrylonitrile, propiononitrile, phenylnitrile, methacrylonitrile, etc., can likewise be used. The preferred complexing agent for use in accordance with this invention is butadiene. It is also within the purview of this invention to employ fluid (gaseous or liquid) streams containing the above mentioned complexing compounds diluted with an inert vehicle (gas or liquid) or natural petroleum streams, e.g. butadiene diluted with butenes and butanes, butadiene diluted with nitrogen, methane, etc. Any of these diluted streams containing the above mentioned complexing agents can be used so long as the diluent(s) do not adversely affect the formation and precipitation of the desired cuprous halide complex.

The complexing is conducted to substantially completely complex the cuprous halide with the chosen complexing agent preferably by passing the complexing agent as a gas into the cuprous halide-solvent solution while the temperature thereof is maintained at from about —40 to 50° F., usually —20 to 45° F., and preferably —10 to +40° F., using pressure ranging from about 0 to 50 p.s.i.g. for complexation and growth periods usually ranging from about 15 to 20 minutes. It has been found helpful to control the rate of addition of the complexing agent to a rate ranging from about 0.05 to 0.6 mol of complexing compound per hour per mole of cuprous halide salt dissolved in the olefinic solvent.

When the complexing agent is butadiene, the butadiene can be used in concentrated or dilute form, e.g. diluted with either an inert gas, such as nitrogen, methane, ethane, etc.; or naturally diluted butadiene is present in butadiene-containing $C_4$ petroleum streams, e.g. butadiene diluted with butenes and butanes, can be employed so long as the diluent does not interfere with the substantially complete participation of the desired solid cuprous halide-butadiene complex. When using butadiene as a complexing agent, the temperature at which the butadiene is contacted with the cuprous halide solution usually ranges from about —40 to +40° F. In such cases, the butadiene is usually added in gas form (diluted or undiluted with an inert gas) into a cuprous halide solution at a butadiene addition rate ranging from about 0.05 to 0.5 mol of butadiene per hour per mole of dissolved cuprous halide salt. Complexation is continued over a 15 to 120 minute time period to allow for substantially complete complexation of the cuprous halide salt dissolved in the previous incremental dissolving step. The term "substantially complete complexation" as used herein is employed to denote the complexing of from about 75 to 99 percent of the dissolved cuprous halide salt, usually from 90 to 99 percent thereof, and more preferably from 95 to 99 percent thereof.

After substantially complete precipitation of the cuprous halide salt from the previous incremental addition has taken place, additional incremental additions are conducted as mentioned hereinabove. During subsequent incremental additions of cuprous halide salt, the butadiene addition is usually not interrupted.

The entire amount of cuprous halide-butadiene complex is then activated (decomplexed) thermally to prepare the activated cuprous halide sorbent particles by subjecting the complex particles to conditions of temperature and pressure such that the dissociation pressure of the complex exceeds the partial pressure of the complexing agent. Consequently, the complex decomposes with release of the complexing agent (ligand).

This decomplexing can be accomplished at temperatures of about 140 to 200° F., usually about 160 to 190° F. and more preferably at temperatures of about 170 to about 190° F. The decomplexing is usually accomplished in the following manner. The complex, as a wet cake from a filter-separator, is collected in a suitable vessel. Stripping gas is admitted to the bottom of the vessel. Heat is applied to the vessel and/or stripping gas, which promotes drying of the complex. As the free liquid solvent is removed, the complex loses its cake form and discrete particles readily fluidize. Decomplexing to form the activated cuprous halide sorbent is then accomplished by heating at 170 to 190° F. (vessel temperature) at atmospheric pressure using 0.3 ft./sec. superficial stripping gas velocity.

The activated cuprous halide sorbent particles prepared according to this invention are porous and have a characteristic porosity of at least 10% (of the total volume of a particle) 550 to 10,000 A. pores, as determined by mercury porosimeter measurements. The average size (particle size diameter) of said active cuprous halide sorbents characteristically ranges from 50 to 100 microns.

The separation process, wherein the thus formed active cuprous halide sorbent particles are used to selectively sorb the olefin or other compound sought to be recovered, is conducted by contacting the active sorbent, e.g. in the form of a fixed or fluidized bed, with a gaseous or liquid stream containing the olefin to be separated. The olefin, or other compound, is sorbed (complexed) on the active cuprous halide particles. Usually the separation is conducted at temperatures of about 50° F. or lower coupled with a partial pressure of the desired olefin of about 3 p.s.i or greater from varying time periods until the capacity of the activated cuprous halide sorbent particles is substantially occupied by the sorbed olefin, sought to be removed selectively. Where the olefin sought to be selectively sorbed is butadiene, the selective removal thereof is usually accomplished by contacting the active cuprous halide sorbent with the butadiene-containing feed stream at temperatures of about 25 to 35° F. until the sorbent is loaded therewith. The loaded sorbent is then stripped free of enclosed gases, preferably employing a portion of the olefin being recovered as a stripping gas.

The loaded and stripped sorbent is then subjected to desorption (recovery) conditions to recover the selectively separated olefin therefrom. The separated olefin can be recovered readily from the loaded and stripped sorbent by heating, i.e. subjecting the loaded sorbent to conditions of temperature and pressure such that the dissociation pressure of the sorbent-ligand complex exceeds the partial pressure of the sorbed olefin (or other ligand sought to be recovered from said sorbent). For butadiene recovery, viz., where the selectively sorbed olefin is butadiene, this usually means heating the loaded sorbent at 170 to 190° F. as noted above. The thermally released olefin is then collected by conventional means.

The present invention will be illustrated in great detail by the following examples, which are intended to illustrate the present invention rather than being limitative thereon.

Example 1

100 grams of cuprous chloride powder (99+% purity and having a water content of less than .1 to .5%) are added to 1000 grams of a previously cooled $C_6$ olefinic solvent cut obtained from the wax cracking process with agitation. The $C_6$ olefin cut was previously cooled to 0° C. (−32° F.) and is composed of the following components in the below indicated weight concentration:

| Component: | Concentration, wt. percent |
|---|---|
| Saturates | 0.5 |
| Olefins | 93.2 |
| Linear | 88.2 |
| Cyclic | 5.0 |
| Dienes | 5.8 |
| Conjugated | 0.5 |
| Nonconjugated | 5.3 |
| Aromatic | 0.5 |

After stirring the solution for 1–5 minutes, butadiene is introduced by a dipleg submerged in the liquid over a 60 to 120 minute time period to precipitate essentially all of the dissolved cuprous chloride (0.36% solids still in solution). A sample of this slurry was obtained, and the product filtered off and decomplexed in a vacuum oven for particle size analysis.

Example 2

To the final mixture obtained in Example 1, there is added an additional 50 grams of cuprous chloride salt (having the same purity and low moisture content of that employed in Example 1); at the same solvent dissolving temperatures; and agitation and butadiene addition is continued at 0° C. until precipitation of insoluble cuprous chloride-butadiene complex is essentially complete (viz., 97% of complete precipitation). The solid cuprous chloride-butadiene complexed product is then filtered off, decomplexed at temperatures of 160 to 180° F. over a 30 minute decomplexation period; the particles are then collected for particle size distribution analysis.

As will be noted from the above description of this example, the addition, dissolving, and complexation of the total amount of complex to be produced is conducted incrementally with approximately 66% of the total amount of dissolved cuprous halide salt added in one of the incremental steps, viz., the first step. The remaining approximately 33% of the cuprous halide salt is added in the succeeding incremental step.

The size distribution of the product activated cuprous chloride sorbent particles from Examples 1 and 2 was determined by roller analysis and set forth in the below table.

| Range, Microns | Weight Percent | |
|---|---|---|
| | Example 1 Conventional | Example 2 Instant Invention |
| 0-10 | 4.32 | 1.94 |
| 10-20 | 3.78 | 2.89 |
| 20-50 | 75.94 | 41.95 |
| 50-80 | 15.62 | 51.70 |
| 80-110 | 0.07 | 0.30 |
| 110+ | 0.32 | 1.21 |

The increased particle size, and particularly, the reduction in the fines obtained by proceeding in accordance with this invention (Example 2) can clearly be seen from the results obtained using the procedure of Example 2 compared to the conventional preparation of Example 1

*Example 3*

1000 grams of cracked wax $C_6$ olefins were employed as solvent and 40 grams of CuCl powder were added thereto. The solution was then cooled to 0° C. with agitation and stirred 2 hours before butadiene was cut in. With steady conditions, two additional 40 gram increments of cuprous chloride were added at sufficient time intervals to permit essentially complete precipitation. Shortly after the last addition and before complete precipitation (2 weight percent solids still in solution) a sample of solid was caught and decomplexed for size distribution analysis.

*Example 4*

The precipitation mixture of Example III was contacted with additional butadiene to essentially complete precipitation (0.47 percent solids in solution) and the product collected, decomplexed and the size distribution determined by Roller analysis.

| Range, Microns | Weight Percent | |
|---|---|---|
| | Example III | Example IV |
| 0–10 | 4.22 | 1.96 |
| 10–20 | 5.49 | 3.10 |
| 20–50 | 37.34 | 27.65 |
| 50–80 | 51.55 | 64.94 |
| 80–110 | 0.43 | 0.74 |
| 110+ | 0.96 | 1.54 |

Again the data clearly show the improvement gained by the incremental cuprous chloride addition in accordance with this invention.

*Example 5*

90 grams cuprous chloride were dissolved in 1500 mls. isobutylene at 0° F. Butadiene was added with agitation for two hours at such a rate as to introduce about twice the stoichiometric amount of butadiene required to complex the cuprous chloride. Solid sorbent was filtered off and decomplexed for Roller analysis.

*Example 6*

Identical to Example 5 above except only 30 grams cuprous chloride were put in solution before starting butadiene addition. Two 30 gram increments of cuprous chloride were then added at 30 minute intervals after the butadiene addition was started. The solid product was again recovered and decomplexed for Roller analysis.

| Size Range, Microns | Weight Percent | |
|---|---|---|
| | Single Addition | Incremental Addition |
| 0–10 | 5.9 | 2.0 |
| 10–20 | 2.8 | 1.0 |
| 20–50 | 33.7 | 11.4 |
| 50–80 | 52.2 | 34.1 |
| 80–110 | 0.2 | 13.7 |
| 110+ | 1.2 | 40.0 |

The advantage attendant to the present invention by use of the preferred incremental cuprous chloride addition is clearly demonstrated in Examples 2, 3, 4 and 6 hereinabove.

In accordance with this invention, it has been observed that the active sorbent particles produced according to the present invention can remove essentially all, e.g. 95+%, of the butadiene present in hydrocarbon streams containing butadiene in concentrations as low as about 15 wt. percent (based on total hydrocarbons) and even lower. Of course, these sorbents likewise selectively sorb and therefore remove butadiene (or other complexing ligands) from hydrocarbon streams containing less than 15 wt. percent thereof.

Moreover, these active cuprous halide sorbents can be employed to sorb selectively other compounds, organic and inorganic, which are capable of complexing therewith, e.g. ammonia; carbon monoxide; HCN; $C_2$ to $C_{20}$ monoolefins, e.g. ethylene, propylene, etc.; $C_3$ to $C_{20}$ diolefins, e.g. allene; $C_4$ to $C_{20}$ conjugated diolefins, e.g. isoprene, etc.; from mixtures (streams) containing them.

While the present invention has been illustrated in great detail in the foregoing examples, it should be noted that the present invention in its broadest aspects is not necessarily limited to the specific illustrative materials and conditions set forth in these examples.

What is claimed is:

1. A process for preparing active inorganic cuprous halide sorbents, said halide being selected from the group consisting of chlorides, bromides, and iodides, which comprises:
    (a) contacting a portion of total cuprous halide salt to be complexed with a monoolefinic solvent at temperatures of about −40 to 50° F. to form a cuprous halide solution;
    (b) contacting said solution with a complexing agent, capable of forming a stable copper complex having a mole ratio of copper to complexing agent greater than 1:1, at a temperature below about 50° F. to substantially complex the dissolved cuprous halide salt and precipitate an insoluble complex thereof;
    (c) adding the remainder of cuprous halide salt to said solvent in the presence of at least a portion of said insoluble complex using at least one incremental step to add said remainder to dissolve a substantial portion of said remainder in said solvent;
    (d) contacting the resulting cuprous halide solution with said complexing agent at a temperature below about 50° F. to substantially complex the incrementally added portion of said remainder of cuprous halide salt subsequent to each said incremental addition thereof; and
    (e) activating said cuprous halide complex by subjecting it to temperature and pressure conditions whereby the dissociation pressure of said complex exceeds the partial pressure of said complexing agent.

2. A process as in claim 1 wherein said cuprous halide solutions formed in (a) and the incremental(s) of (c) contain undissolved cuprous halide salt.

3. A process as in claim 1 wherein said cuprous halide is cuprous chloride.

4. A process as in claim 1 wherein said complexing agent is butadiene.

5. A process as in claim 1 wherein said monoolefinic solvent is comprised chiefly of a $C_3$ to $C_{12}$ monoolefin.

6. A process as in claim 1 wherein the said portion of the total cuprous halide salt in (a) ranges from about 20 to 50 wt. percent.

7. A process as in claim 1 wherein the remainder of cuprous halide salt is added to said solvent in at least two incremental steps the first of which is followed by substantially completely complexing the cuprous halide salt dissolved therein with said complex at a temperature below about 50° F. prior to the second incremental addition of the remaining portion(s) of said remainder in dissolving-complexing sequential increments.

8. A process as in claim 1 wherein the activation of said complex is conducted by heating said complex at temperatures ranging from about 140 to 200° F.

9. A process for preparing active cuprous chloride sorbent which comprises:
    (a) contacting from about 20 to 70 wt. percent of the total cuprous chloride salt to be complexed with a solvent comprised chiefly of $C_3$ to $C_{12}$ monoolefins at temperatures of about −20 to 45° F. to form a cuprous chloride slurry containing dissolved and undissolved cuprous chloride;

(b) contacting said slurry with butadiene at temperatures of about −20 to 45° F. to complex at least about 75 wt. percent of the dissolved cuprous chloride and precipitate it as an insoluble cuprous chloride-butadiene complex;

(c) adding and complexing the remainder of said cuprous chloride salt at temperatures of about −20 to 45° F. serially in at least two incremental addition-complexing steps wherein each said cuprous chloride addition is followed by complexing at least 75 wt. percent of the added and dissolved cuprous chloride salt with butadiene at temperatures of about −20 to 45° F. prior to the next incremental cuprous chloride addition and wherein each incremental cuprous chloride addition step is conducted in the presence of said insoluble complex; and (d) thermally decomplexing said cuprous chloride-butadiene complex by heating at about 170 to 190° F. to form active cuprous chloride sorbent.

10. A process as in claim 9 wherein the portion of cuprous chloride salt contacted in (a) and the incremental steps of (c) ranges from about 20 to about 40 wt. percent.

11. A process as in claim 9 wherein the concentration of dissolved cuprous chloride salt in the slurry ranges from about 2 to about 20 wt. percent after each incremental cuprous chloride addition and prior to each complexation.

References Cited

UNITED STATES PATENTS

| | | | |
|---|---|---|---|
| 2,336,643 | 12/1943 | Schulze | 260—438.1 X |
| 2,386,356 | 10/1945 | Schulze et al. | 260—438.1 X |

MILTON WEISSMAN, *Primary Examiner.*

EDWARD STERN, *Examiner.*